United States Patent [19]

Yoshida et al.

[11] Patent Number: 5,448,465
[45] Date of Patent: Sep. 5, 1995

[54] SWITCHING POWER SUPPLY WITHOUT SWITCHING INDUCED SPIKE VOLTAGES

[75] Inventors: Koji Yoshida, Neyagawa; Nobuyoshi Nagagata, Takatsuki; Takuya Ishii, Suita, all of Japan

[73] Assignee: Matsushita Electric Industrial Co., Ltd., Osaka, Japan

[21] Appl. No.: 111,729

[22] Filed: Aug. 25, 1993

[30] Foreign Application Priority Data

Aug. 25, 1992 [JP] Japan .................. 4-225603
Sep. 3, 1992 [JP] Japan .................. 4-235545
Mar. 8, 1993 [JP] Japan .................. 5-046332

[51] Int. Cl.$^6$ ......................................... H02M 3/335
[52] U.S. Cl. ................................. 363/15; 363/16; 363/21
[58] Field of Search .................. 363/150, 16, 20, 21, 363/95, 97, 131

[56] References Cited

U.S. PATENT DOCUMENTS

| | | | |
|---|---|---|---|
| 4,353,112 | 10/1982 | Rietveld et al. | 363/16 |
| 4,959,764 | 9/1990 | Bassett | 363/16 |
| 5,057,986 | 10/1991 | Henze et al. | 363/20 |
| 5,111,372 | 5/1992 | Kameyama et al. | 363/20 |
| 5,126,931 | 6/1992 | Jitaru | 363/21 |
| 5,146,394 | 9/1992 | Ishii et al. | 363/16 |
| 5,173,846 | 12/1992 | Smith | 363/20 |
| 5,267,133 | 11/1993 | Motomura et al. | 363/21 |
| 5,383,106 | 1/1995 | Yoshida et al. | 363/15 |

OTHER PUBLICATIONS

K. Yoshida, T. Ishii, N. Nagagata, "Zero Voltage Switching Approach For Flyback Converter", *IEEE INTELEC*, No. 15-3, pp. 324–329, (Oct. 1992).

Primary Examiner—Jeffrey L. Sterrett
Attorney, Agent, or Firm—Ratner & Prestia

[57] ABSTRACT

A switching power supply supplies a regulated output voltage and suppresses spike voltage and spike current generated by a switching action of transformers, and suppresses switching frequency drift due to load variation. Output stability of multi-output design is improved and recovery of rectifying diodes by a current resonance are suppressed. A reduction of noise interference to electronic equipments and power loss in the switching power supply itself results. A series connection of a primary winding of a first transformer and a first switching means, which repeats an on/off action is connected across a d-c power source. A series connection of a second switching means, which repeats an on/off action alternately with the first switching means, and a first capacitor is connected in parallel with the primary winding of the first transformer. A series connection of a primary winding of the second transformer and a second capacitor is connected in parallel with the second switching means. Regulated d-c outputs are taken out from each secondary winding of the transformers through rectifiers/filters. A control circuit supplies on/off signals, which on/off-ratios are varied according to one of the regulated d-c outputs, to the first and the second switching means.

6 Claims, 6 Drawing Sheets

FIG. 4(a) Vds PRIOR ART

SWITCHING POWER SUPPLY WITHOUT SWITCHING INDUCED SPIKE VOLTAGES

BACKGROUND OF THE INVENTION (1) Field of the Invention

This invention relates to a switching power supply which supplies a stabilized d-c voltage to industrial or commercial electronic apparatus.

(2) Description of the Prior Art

According to a demand for electronic apparatus with smaller size, higher performance, less power consumption, and lower cost, switching power supplies with smaller size, higher stability of d-c output voltage, higher efficiency, and lower cost have been strongly requested.

Two types of switching power supplies in the prior art are explained below:

FORWARD type

Figure 1:
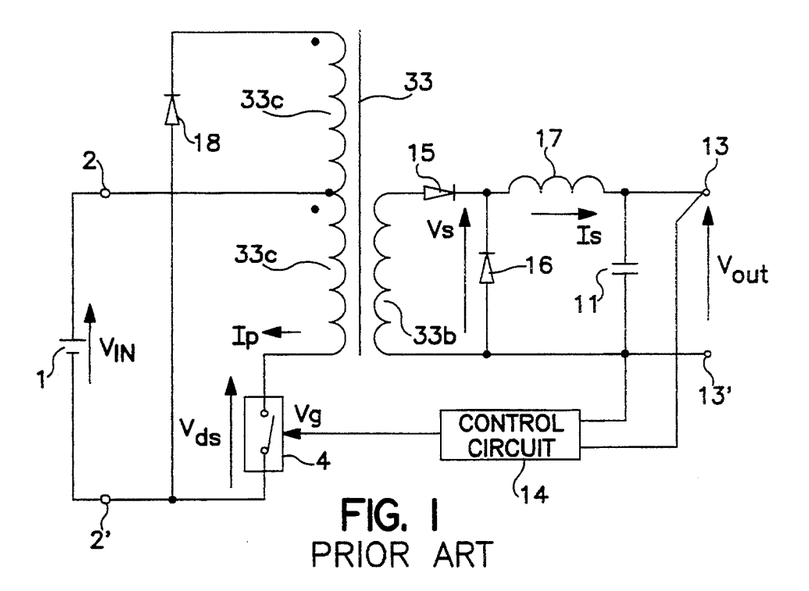
FIG. 1 is a circuit diagram of a first example of a switching power supply in accordance with the prior art.
Figure 2A:
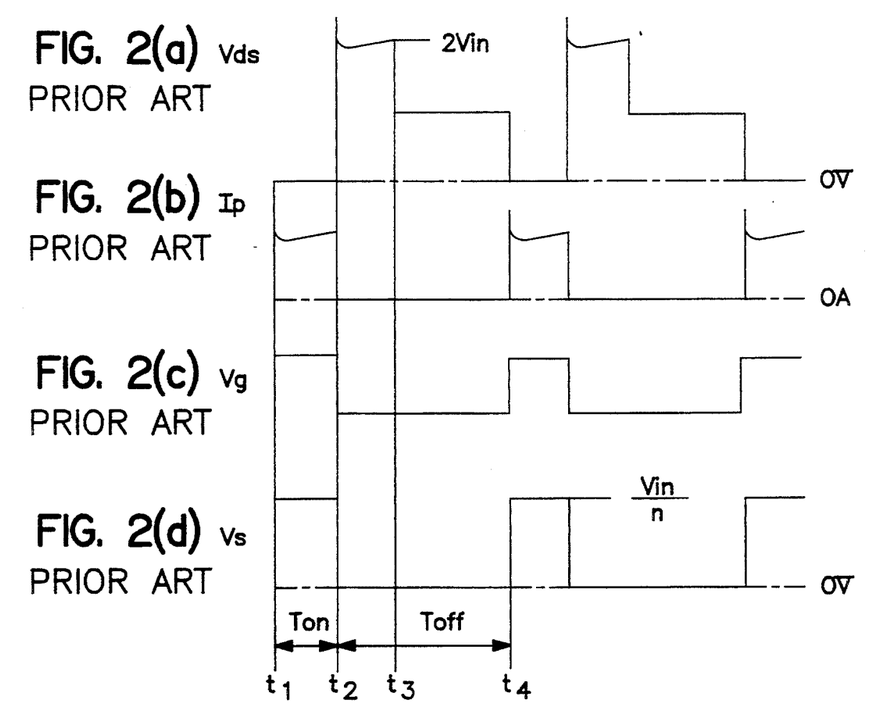

FIG. 1 is a circuit diagram of a "Forward type" switching power supply in accordance with the prior art. In FIG. 1, 1 is a d-c source which is usually obtained by filtering after rectifying of commercial a-c voltage or a battery. The terminals 2 and 2' of the d-c source 1 are a positive side and a negative side, respectively. 33 is a transformer having a primary winding 33a, a secondary winding 33b, and a reset winding 33c. A terminal of the primary winding 33a is connected to the positive side 2 of the d-c source 1 and another terminal is connected to the negative side 2' of the d-c source 1 via a switching means 4.

A terminal of the secondary winding 33b is connected to the positive terminal 13 of the d-c output via a rectifying diode 15 and an inductor 17 and another terminal of the secondary winding 33b is connected to the negative terminal 13' of the d-c output.

A terminal of the reset winding 33c is connected to the positive terminal 2 of the d-c source 1 and another terminal is connected to the negative terminal 2' of the d-c source 1 via a diode 18. A control circuit 14 generates a repeating on/off signal, detects the output voltage across the output terminal 13–13', outputs a signal with on/off ratio according to the above output voltage, turns the switching means 4 on and off, and the switching means 4 applies and cuts the d-c source voltage to the primary winding 33a of the transformer 33. The rectifying diode 15 leads an induced voltage in the secondary winding 33b when the switching means 4 is switched to the inductor 17.

A clamping diode 16 is on when the rectifying diode 15 is off and makes the negative side of the voltage induced in the secondary winding 33b zero volts. The inductor 17 supplies d-c current to the output terminal 13–13' by filtering the voltages through the rectifying diode 15 and the clamping diode 16. A filtering capacitor 11 is connected between the output terminals 13 and 13' and holds the voltage averaged by the inductor 17.

The control circuit 14 detects the voltage across the output terminals 13 and 13' and changes an on/off duty ratio of the switching means 4 so that the output voltage is held constant. The diode 18 clamps a flyback pulse induced in the reset winding 33c when the switching means 4 turns to off, resets a magnetic flux of the transformer 33, and absorbs a spike voltage.

FIG. 2(a) to (d) illustrate the waveforms in the switching power supply shown in FIG. 1.

(a) is a voltage waveform Vds across the switching means 4, (b) is a current waveform Ip which flows in the switching means 4, (c) is an on/off signal Vg from the control circuit 14, which controls the switching means 4, and (d) is a voltage waveform Vs across the clamping diode 16.

When the switching means 4 turns to on at the time t1 by the on/off signal Vg, a spike current flows in the switching means 4. This is caused by charging and discharging currents of a distributed capacitance such as interwinding capacitances and an interlayer capacitance and a discharging current of a parasitic capacitance of the switching means 4. This spike current induces increased noise, reduced reliability, and increased power loss.

When the switching means 4 turns to on and Vds becomes small enough, the input voltage Vin is applied to the primary winding 33a of the transformer 33 and a voltage (Vin/n) is induced in the secondary winding 33b and the rectifying diode 15 turns on.

A turn-ratio of the primary winding 33a to the secondary winding 33b is represented as n. When the rectifying diode 15 turns on, the clamping diode 16 turns off and the voltage across the clamping diode 16 Vs becomes (Vin/n) and the current flows into a load through the inductor 17.

Therefore, in the primary winding 33a is found a sum of the primary current (Io/n) converted from the current Io in the secondary winding 33b and an exciting current of the primary winding 33a. When the switching means 4 turns to off at the time t2 by the on/off signal Vg, a spike voltage is induced in the primary winding 33a due to a leakage inductance. This spike voltage results in a noise and power loss.

When a flyback voltage is induced in the reset winding 33c and the diode 18 turns on, the input d-c source 1 is applied across the reset winding 33c. As the turn-ratio of the reset winding 33c to the primary winding 33a is made as (1 to 1), a voltage of (2×Vin) appears across the switching means 4, a voltage which gives reverse bias to the rectifying diode 15 is induced in the secondary winding 33b of the transformer 33, the rectifying diode 15 turns off, and the clamping diode 16 turns on by the current of the inductor 17. Consequently, the voltage Vs across the clamping diode 16 becomes 0. At the same time, a recovery voltage appears across the diode 15 and ringings of current and voltage are generated which results in noise and power loss. When the current of the reset winding 3c becomes 0 at the time t3, the diode 18 becomes off and the voltage across the primary winding 33a becomes 0 and the d-c source voltage Vin is applied across the switching means 4.

As no voltage is induced in the secondary winding 33b of the transformer 33 at this time, the rectifying diode 15 is held in an off-state and the clamping diode 16 is held in an on-state. When the switching means 4 turns to on by the on/off signal Vg from the control circuit 14, the d-c source voltage Vin is applied across the primary winding 33a and then the voltage (Vin/in) appears across the secondary winding 33b, the rectifying diode 15 turns to on, and the clamping diode 16 turns to off. At this time, a recovery voltage is generated also in the clamping diode 16 and current and voltage ringings are generated which results in noise and power loss.

As the output voltage Vout is a mean value of the voltage Vs across the clamping diode 16, $$Vout = \{Ton/(Ton+Toff)\} \times (Vin/n),$$

where Ton and Toff is an on-period and an off-period of the switching means 4, respectively.

Thus, regulation of the output voltage is possible by changing the on/off ratio of the switching means 4.

FLYBACK type

Figure 3:
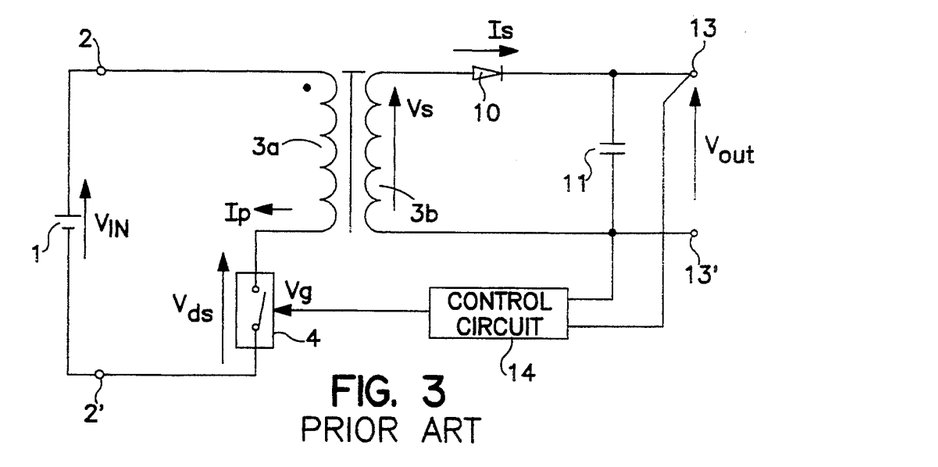
FIG. 3 is a circuit diagram of a second example of a switching power supply in accordance with the prior art.
Figure 4A:
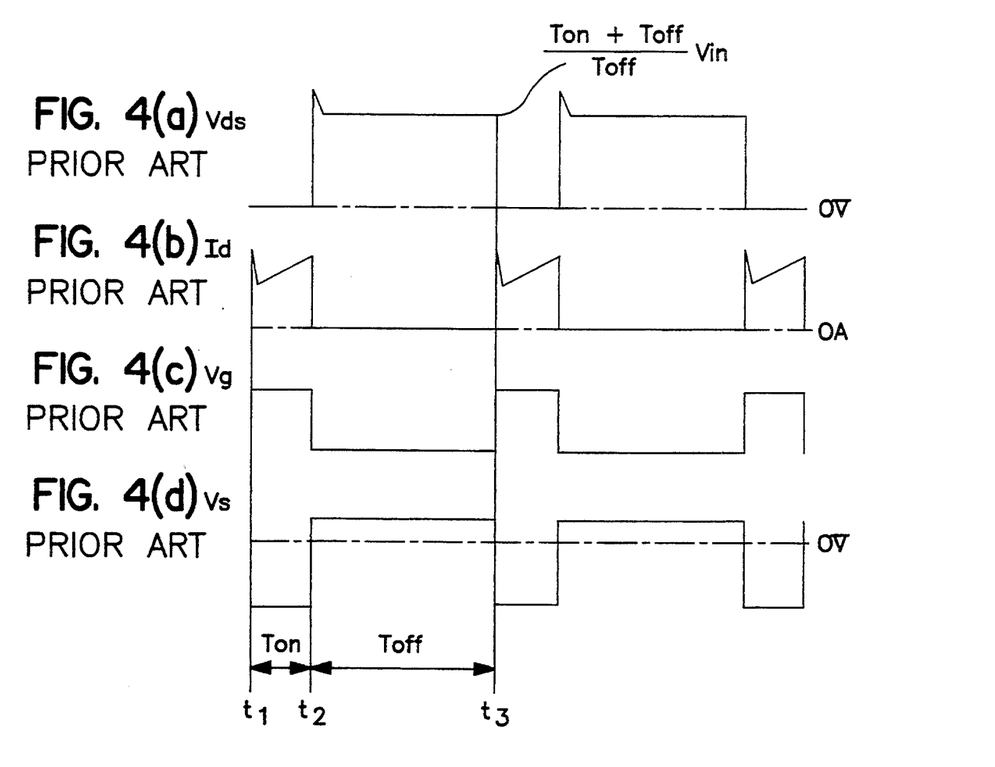

FIG. 3 is a circuit diagram of a "Flyback type" switching power supply in accordance with the prior art. In FIG. 3, the components which have the same functions as those in FIG. 1 have the same number and their descriptions are omitted.

FIG. 4(a) to (d) illustrate waveforms in the switching power supply shown in FIG. 3.
(a) is a voltage waveform Vds across the switching means 4,
(b) is a current waveform Id flowing in the switching means 4,
(c) is an on/off signal Vg from the control circuit 14, which controls the switching means 4, and
(d) is a voltage waveform Vs which is induced across the secondary winding 3b.

When the switching means 4 turns to on at the time t1 by the on/off signal Vg, a spike current flows in the switching means 4 depending on the variation of the voltage Vds across the switching means 4. This is due to a charging and discharging current to a distributed capacitance such as interwinding capacitance and interlayer capacitance of the transformer 3 and due to a discharging current of a parasitic capacitance in the switching means 4. This spike current induces increased noise, decreased reliability, and increased power loss.

When the switching means 4 is on and the voltage across the switching means 4 Vds becomes small enough, the input voltage Vin is applied to the primary winding 3a of the transformer 3 directly and a voltage (Vin/n) is induced across the secondary winding 3b and the diode 10 is biased inversely and turns off. A turn-ratio of the primary winding 3a to the secondary winding 3b is represented as n. Consequently, the exciting current of the transformer 3 flows in the primary winding 3a and it increases linearly.

When the switching means 4 turns to off by the on/off signal Vg at the time t2, a spike voltage due to a leakage inductance of the transformer 3 is induced. This spike voltage causes a noise and power loss.

And when a flyback pulse is induced across the secondary winding 3b of the transformer 3 and the rectifying diode 10 turns on, it is clamped at the output voltage Vout which is held in the capacitor 11. The voltage (Vin+n×Vout) is applied across the switching means 4. When the switching means 4 turns to on by an on/off signal from the control circuit 14 at the time t3, the d-c source voltage Vin is applied across the primary winding 3a. And the voltage (Vin/n) is induced across the secondary winding 3b of the transformer 3 and the diode 10 turns to off. At this time a recovery voltage is induced in the rectifying diode 10, and current and voltage ringings are also induced, resulting in noise and power loss.

The output voltage Vout is expressed as follows from a reset condition of the transformer 3.

$$Vout = (Ton/Toff) \times (Vin/n),$$

where, Ton is an on-period and Toff is an off-period of the switching means 4. Thus, a regulation of the output voltage is possible by changing an on/off ratio of the switching means 4.

However, in a circuit configuration in the prior art, both in a forward type and in a flyback type, a spike current is induced when the switching means 4 turns to on, a spike voltage is induced when the switching means 4 turns to off, and a recovery voltage is generated when the rectifying diodes 15 and 10 turn to off. This is a problem because a spike current, a spike voltage, and a diode recovery voltage make noise, and give some interference to electronic apparatus and make some power losses in the power supply itself.

SUMMARY OF THE INVENTION

The present invention relates to a switching power supply which includes a circuit configuration including,
a series connection of a primary winding of a first transformer and a first switching means, which repeats an on/off action according to a specified timing of a signal from a control circuit, and is connected across a d-c power source,
a series connection of a second capacitor and a second switching means, which repeats on/off action alternately with the first switching means, and is connected in parallel with the first switching means,
a series connection of a second capacitor and a primary winding of a second transformer which is connected in parallel with the second switching means,
a first and a second rectifying/filtering means connected in parallel with each secondary winding of the first and the second transformers, respectively, and
a control circuit controlling the on/off ratio of the first and the second switching means according to the output voltage of either one of the first or the second rectifying/filtering means.

According to the present invention, as the first and the second switching means turn to on after discharging energy stored in parasitic capacitances of the switching means and distributed capacitances of the transformers, no spike current flows.

When the first and the second switching means turns to off, no spike voltage due to leakage inductance of the transformers is induced.

The currents flowing in the transformers are always continuous and on/off period drift of the switching means due to load condition is suppressed.

In the case of multiple outputs, as the number of turns of the transformers can be set independently, design restriction decreases.

Output voltage regulation can be improved by utilizing a slight voltage variation of the resonant capacitor. As rectifying diodes in the output circuits are switched at zero current by utilizing a current resonance, no turn-off recovery voltage is induced and as turn-off current of the switching devices can be small, turn-off switching loss can be small, too.

Furthermore, by changing the capacitance values of the two resonant capacitors, two kinds of resonance frequencies can be obtained according to each leakage inductance of the two transformers.

BRIEF DESCRIPTION OF THE DRAWINGS

FIGS. 2(a)–2(d) illustrate waveforms in a switching power supply shown in FIG. 1.

FIGS. 4(a)–4(d) illustrate waveforms in a switching power supply shown in FIG. 3.

FIGS. 8(a)–8(j) illustrate waveforms in a switching power supply shown in FIG. 5, FIG. 6 and FIG. 7.

DETAILED DESCRIPTION OF THE INVENTION

(First exemplary embodiment)

Figure 5:
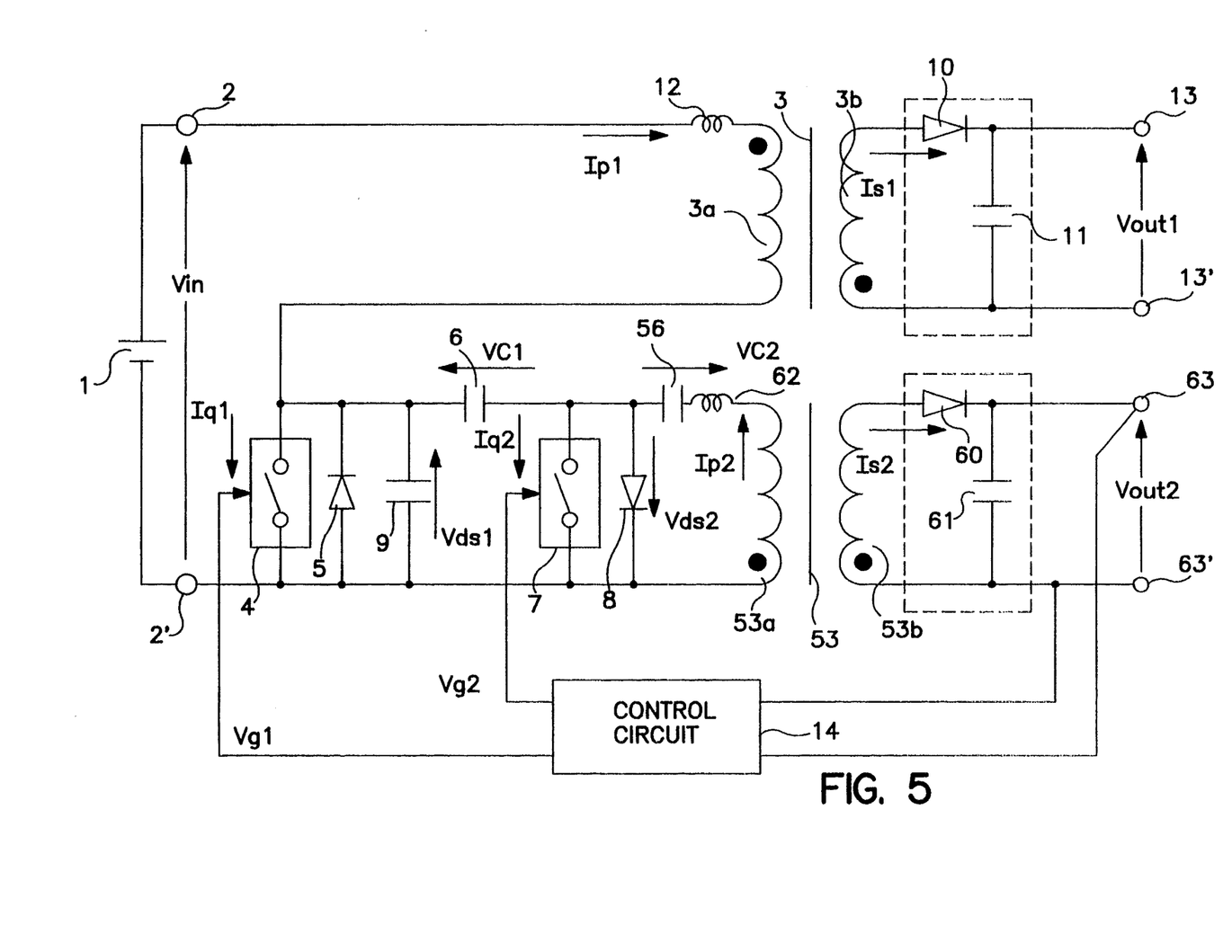
FIG. 5 is a circuit diagram of a switching power supply in accordance with an exemplary embodiment of the present invention.
Figures 8A, 8J:
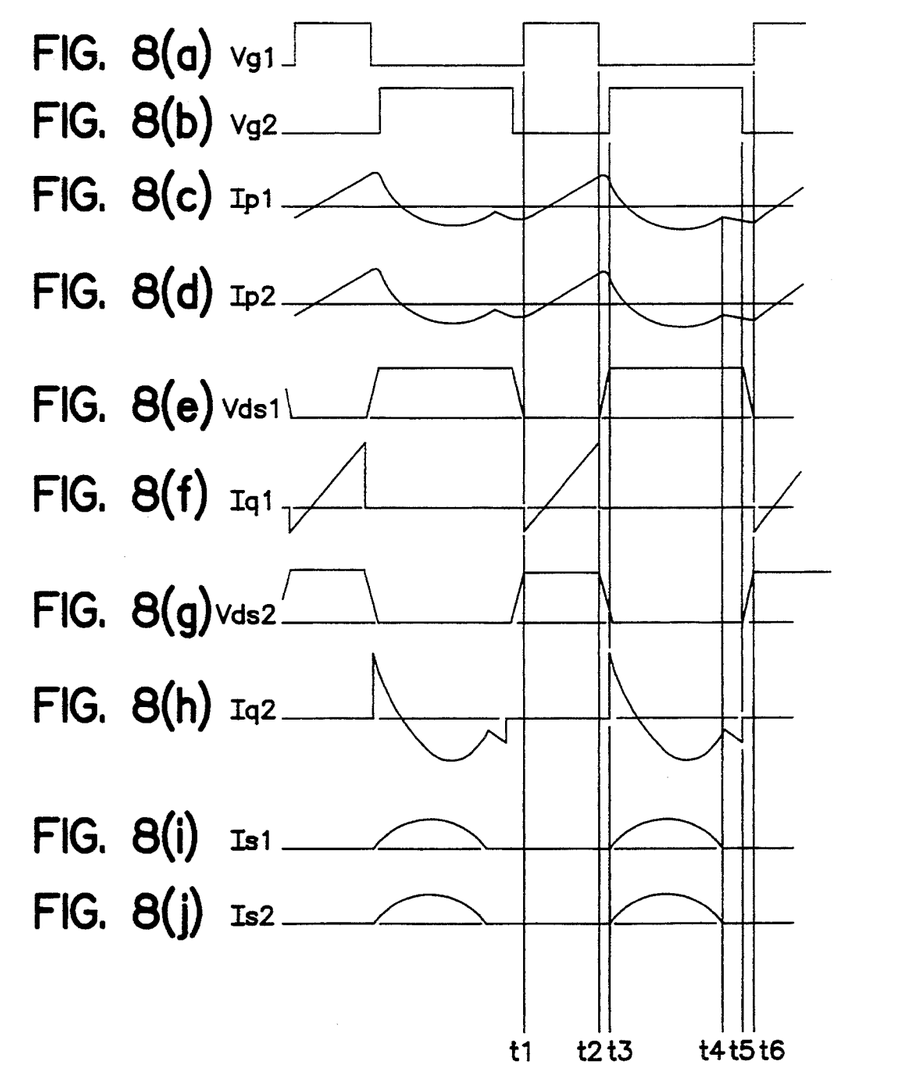

A first exemplary embodiment of the present invention is illustrated by FIG. 5 and FIG. 8. FIG. 5 shows a circuit diagram of the switching power supply.

A d-c source 1 has a positive terminal 2 and a negative terminal 2′. A first transformer 3 has a primary winding 3a and at least one secondary winding 3b. The secondary winding 3b is wound with an opposite polarity to the primary winding 3a as shown with black dots in the figure. A second transformer 53 has a primary winding 53a and at least one secondary winding 53b. The secondary winding 53b is wound with the same polarity as the primary winding 53a as shown with black dots.

A first switching means includes a parallel connection of a first switching device 4 and a first diode 5. A second switching means includes a parallel connection of a second switching device 7 and a second diode 8.

A first capacitor 6 holds d-c voltage Vc1 and a second capacitor 56 holds d-c voltage Vc2. A third capacitor 9 is connected in parallel with the first switching device 4 and suppresses a steep surge voltage across the first switching device 4 and the second switching device 7. The capacitance value of the third capacitor 9 is much smaller than those of the first and the second capacitors 6 and 56.

A first rectifying/filtering means includes a first rectifying diode 10 and a filtering capacitor 11 and is connected across the secondary winding 3b of the first transformer 3 and a first regulated d-c output voltage is taken out from a first output terminal 13–13′ through the first rectifying/filtering means. A second rectifying/filtering means includes a second rectifying diode 60 and a second filtering capacitor 62 and is connected across the secondary winding 53b of the second transformer 53 and a second regulated d-c output is taken out from a second output terminal 63–63′ through the second rectifying/filtering means.

A first leakage inductance or a first external inductor 12 is connected in series with the primary winding 3a of the first transformer 3 and resonates with the first capacitor 6 during an on-period of the second switching device 7 and makes a current flowing in the secondary winding 3b of the first transformer 3 sinusoidal. A second leakage inductance or a second external inductor 62 is connected in series with the primary winding 53a of the second transformer 53 and resonates with the second capacitor 56 during an on-period of the second switching device 7 and makes a current flowing in the secondary winding 53b of the second transformer 53 sinusoidal. The external inductors are added when a desired resonance period cannot be obtained with only a leakage inductance of the transformer.

A control circuit 14 detects a voltage Vout2 across the second output terminal 63–63′ and varies on/off ratios of signals to the first switching device 4 and to the second switching device 7 according to the value of the detected output voltage Vout2 so that the first and the second output voltages Vout1 and Vout2 become constant. The first switching device 4 repeats an on/off action and the second switching device 7 repeats an off/on action. That is, while the first switching device 4 is on, the second switching device 7 is off, and vice versa. However, both switching devices 4 and 7 are off during two short transition periods, that is, an period from the time t2 (the first switching device 4 turns to off) to the time t3 (the second switching device 7 turns to on) and another period from the time t5 (the second switching device 7 turns to off) to the time t6 (the first switching device 4 turns to on).

FIG. 8(a) to (j) illustrate waveforms in the switching power supply shown in FIG. 5.

(a) is a voltage waveform Vg1 of a signal from the control circuit 14, which controls the first switching device 4.

(b) is a voltage waveform Vg2 of a signal from the control circuit 14, which controls the second switching device 7.

(c) is a current waveform Ip1 flowing in the first switching device 4 or the first diode 5 (not including the third capacitor 9).

(d) is a current waveform Ip2 flowing in the second switching device 7 or the second diode 8.

(e) is a voltage waveform Vds1 across the first switching device 4.

(f) is a current waveform Iq1 flowing in the first switching means.

(g) is a voltage waveform Vds2 across the second switching device 7.

(h) is a current waveform Iq2 flowing in the second switching means.

(i) is a current waveform Is1 flowing in the secondary winding 3b of the first transformer 3.

(j) is a current waveform Is2 flowing in the secondary winding 53b of the second transformer 53.

When the first switching device 4 turns to on and the second switching device 7 turns to off according to signals from the control circuit 14 at the time t1, d-c source voltage Vin is applied across the primary winding 3a of the first transformer 3. Across the primary winding 53a of the second transformer 53, the difference voltage (Vc1−Vc2) between the d-c voltage Vc1 across the first capacitor 6 and the d-c voltage Vc2 across the second capacitor 56 is applied. At this time, both the first rectifying diode 10 connected to the secondary winding 3b of the first transformer 3 and the second rectifying diode 60 connected to the secondary winding 53b of the second transformer 53 are in an off-state. Both the primary current Ip1 of the first transformer 3 and the primary current Ip2 of the second transformer 53 linearly increase and exciting energy is stored both in the first transformer 3 and in the second transformer 53.

When the first switching device 4 turns to off at the time t2 according to an off-signal from the control circuit 14, the current Iq1 flowing in the first switching device 4 charges the third capacitor 9 up, the voltage Vds1 across the first switching device 4 gradually increases, and the voltage Vds2 across the second switching device 7 gradually decreases.

The voltage Vds2 across the second diode 8 decreases, the second diode 8 turns to on at the time t3 and at the same time the second switching device 7 turns to on according to an on- signal Vg2 from the control circuit 14. The performance does not change even if the current 1q2 flows through any one of the second diode 8 or the second switching device 7.

When the first switching means turns to off and the second switching means turns to on, a difference voltage (Vc1−Vin) between the voltage Vc1 across the first capacitor 6 and the d-c source voltage Vin is applied across the primary winding 3a of the first transformer 3. At the same time, the voltage Vc2 across the second capacitor 56 is applied across the primary winding 53a of the second transformer 53. The first rectifying diode 10 connected to the secondary winding 3b of the first transformer 3 turns to on and a current is supplied to the first output terminal 13–13'. The second rectifying diode 60 connected to the secondary winding 53b of the second transformer 53 turns to on and a current is supplied to the second output terminal 63–63', too.

The first capacitor 6 and the first leakage inductance or the first external inductor 12 of the first transformer 3 make a resonance, and the current Is1 flowing in the first rectifying diode 10 flows increasingly from zero at t3 and returns to zero again at t4, varying sinusoidally. Similarly, the second capacitor 56 and the second leakage inductance or the second external inductor 62 of the second transformer 53 make a resonance at the same time t3, and the current ls2 flowing in the second rectifying diode 60 flows increasingly from zero at t3 and returns to zero again at t4, varying sinusoidally. As both the first rectifying diode 10 and the second rectifying diode 60 turn to off at zero current, turn-off recovery is not generated. When the first rectifying diode 10 and the second rectifying diode 60 turn to off, exciting currents Ip1 and Ip2 flow in the primary winding 38 of the first transformer 3 and in the primary winding 53a of the second transformer 53, respectively. Both currents decrease during the on-period of the second switching device 7, then become negative, and both the first transformer 3 and the second transformer 53 are excited inversely.

When the second switching device 7 turns to off at the time t5 according to an off signal from the control circuit 14, the third capacitor 9 discharges with an inverse exciting current and the voltage Vds1 across the first switching device 4 gradually decreases. The voltage Vds1 decreases and the first diode 5 turns to on and at the same time the first switching device 4 turns to on according to a signal from the control circuit 14. The performance does not change even if the current Iq1 flows through any one of the second switching device 4 or the second diode 5. When the first switching device 4 turns to on and the second switching device 7 turns to off, the d-c source voltage Vin is applied across the primary winding 3a of the first transformer 3, and the difference voltage (Vc1−Vc2) between the voltage Vc1 across the first capacitor 6 and the voltage Vc2 across the second capacitor 56 is applied across the primary winding 53a of the second transformer 53. This action is repeated. Although the turn-on timing among the second diode 8, the first rectifying diode 10 and the second rectifying diode 60 and the turn-off timing between the first rectifying diode 10 and the second rectifying diode 60 may not perfectly coincide depending on output current, basic performance does not change.

Assuming an on-period of the first switching means Ton, and an on-period of the second switching means Toff, and neglecting the periods when both the first and the second switching devices 4 and 7 are simultaneously off, the following equations are derived from a reset condition of the first transformer 3.

$$Vin \times Ton = (Vc1 - Vin) \times Toff,$$

and from a reset condition of the second transformer 53, $$(Vc1 - VC2) \times Ton = Vc2 \times Toff.$$

From the above two equations, Vc1 and Vc2 are derived as follows:

$$Vc1 = \{(Ton + Toff)/Toff\} \times Vin,$$

and $$Vc2 = (Ton/Toff) \times Vin.$$

If the turn-ratio of the primary winding 3a to the secondary winding 3b of the first transformer 3 is (n1: 1) and the turn-ratio of the primary winding 53a to the secondary winding 53b of the second transformer 53 is (n2: 1), the output voltage Vout1 across the first output terminals 13 and 13' is:

$$\begin{aligned} Vout1 &= (Vc1 - Vin)/n1 \\ &= (Ton/Toff) \times (Vin/n1), \end{aligned}$$ and the output voltage Vout2 across the second output terminals 53 and 53, is:

$$\begin{aligned} Vout2 &= Vin/n2 \\ &= (Ton/Toff) \times (Vin/n2). \end{aligned}$$

Thus both the first d-c output voltage Vout1 and the second d-c output voltage Vout2 can be controlled by varying the on/off ratio of the first switching device 4 and the second switching device 7.

(Second exemplary embodiment)

Figure 6:
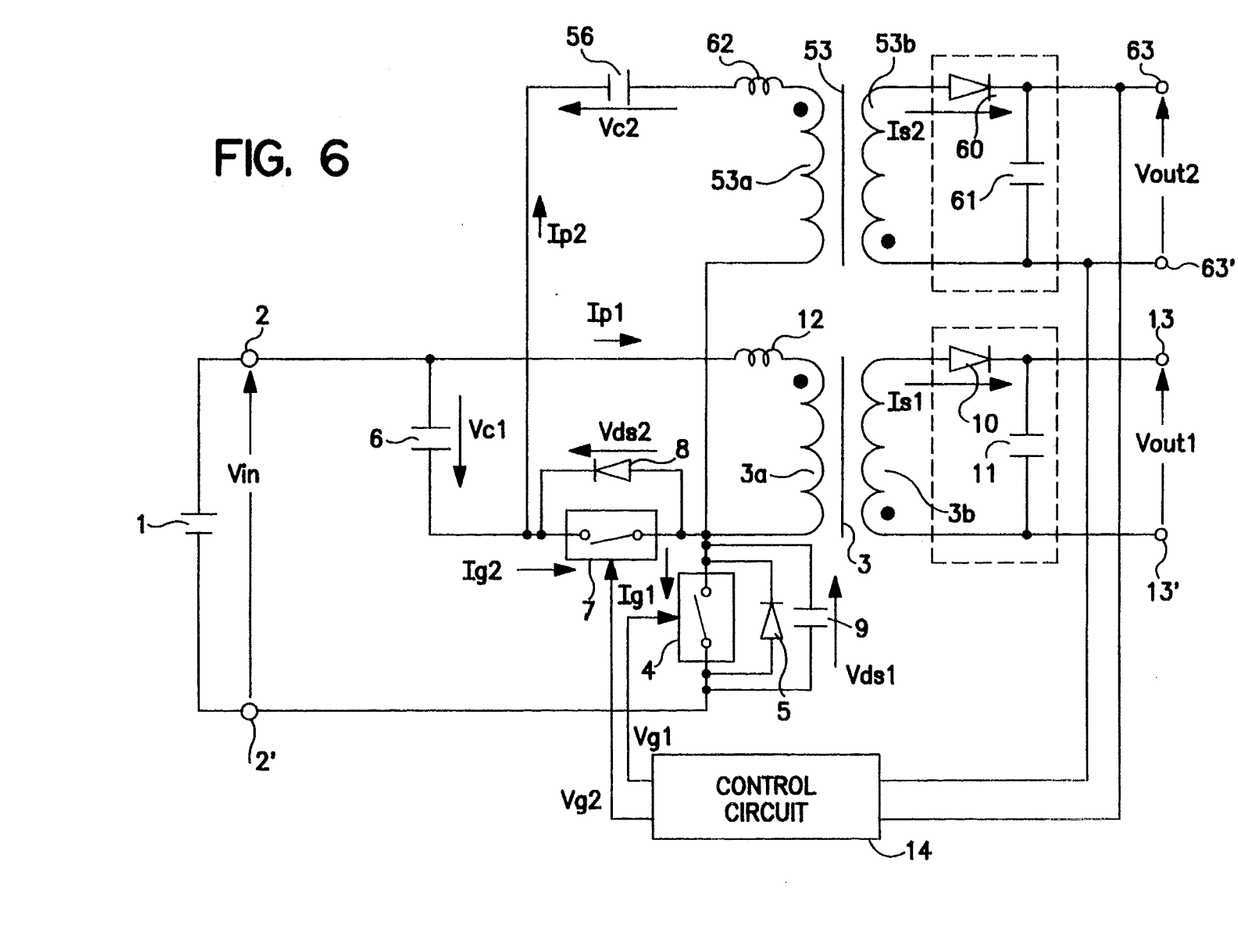
FIG. 6 is a circuit diagram of a switching power supply in accordance with a further exemplary embodiment of the present invention.

A second exemplary embodiment of the present invention is illustrated by FIG. 6 and FIG. 8. FIG. 6 shows a circuit diagram of the switching power supply. Although the circuit configuration of the second exemplary embodiment is different from that of the first exemplary embodiment, waveforms at each point in FIG. 6 are quite the same as those in the first exemplary embodiment, so the function is explained referring FIG. 8(a)–(j).

A d-c source 1 has a positive terminal 2 and a negative terminal 2'. A first transformer 3 has a primary winding 3a and at least one secondary winding 3b. The secondary winding 3b is wound with an opposite polarity to the primary winding 3a as shown with black dots in the figure. A second transformer 53 has a primary winding 53a and at least one secondary winding 53b. The secondary winding 53b is wound with the same polarity as the primary winding 53a as show with black dots.

A first switching means is composed of a parallel connection of a first switching device 4 and a first diode 5. A second switching means is composed of a parallel connection of a second switching device 7 and a second diode 8.

A first capacitor 6 holds d-c voltage Vc1 and a second capacitor 56 holds d-c voltage Vc2. A third capacitor 9 is connected in parallel with the first switching device 4 and it suppresses a steep surge voltage across the first switching device 4 and the second switching device 7. The capacitance value of the third capacitor 9 is much smaller than those of the first and the second capacitors 6 and 56.

A first rectifying/filtering means is composed of a first rectifying diode 10 and a filtering capacitor 11 and is connected across the secondary winding 3b of the first transformer 3 and a first regulated d-c output voltage is taken out from a first output terminal 13-13' through the first rectifying/filtering means. A second rectifying/filtering means is composed of a second rectifying diode 60 and a second filtering capacitor 61 and is connected across the secondary winding 53b of the second transformer 53 and a second regulated d-c output is taken out from a second output terminal 63-63' through the second rectifying/filtering means.

A first leakage inductance or a first external inductor 12 is connected in series with the primary winding 3a of the first transformer 3 and resonates with the first capacitor 6 during an on-period of the second switching device 7 and makes a current flowing in the secondary winding 3b of the first transformer 3 sinusoidal. A second leakage inductance or a second external inductor 62 is connected in series with the primary winding 53a of the second transformer 53 and resonates with the second capacitor 56 during an on-period of the second switching device 7 and makes a current flowing in the secondary winding 53b of the second transformer 53 sinusoidal. The external inductors are added when they are insufficient to obtain a desired resonance period if with only a leakage inductance of the transformer.

A control circuit 14 detects a voltage Vout2 across the second output terminal 63-63' and varies on/off ratios of signals to the first switching device 4 and to the second switching device 7 according to the value of the detected output voltage Vout2 so that the first and the second output voltages Vout1 and Vout2 become constant. The first switching device 4 repeats an on/off action and the second switching device 7 repeats an off/on action. That is, while the first switching device 4 is on, the second switching device 7 is off, and vice versa except that both switching devices 4 and 7 are off during two short transition periods. The two periods are from the time t2 (the first switching device 4 turns to off) to the time t3 (the second switching device 7 turns to on) and from the time t5 (the second switching device 7 turns to off) to the time t6 (the first switching device 4 turns to on).

When the first switching device 4 turns to on and the second switching device 7 turns to off according to signals from the control circuit 14 at the time t1, d-c source voltage Vin is applied across the primary winding 3a of the first transformer 3. Across the primary winding 53a of the second transformer 53, the voltage (Vin+Vc1−Vc2) is applied. At this time, both the first rectifying diode 10 connected to the secondary winding 3b of the first transformer 3 and the second rectifying diode 60 connected to the secondary winding 53b of the second transformer 53 are in an off-state. Both the primary current Ip1 of the first transformer 3 and the primary current Ip2 of the second transformer 53 linearly increase and exciting energy is stored both in the first transformer 3 and in the second transformer 53.

When the first switching device 4 turns to off at the time t2 according to an off-signal from the control circuit 14, the current Iq1 flowing in the first switching device 4 charges the third capacitor 9 up, the voltage Vds1 across the first switching device 4 gradually increases, and the voltage Vds2 across the second switching device 7 gradually decreases.

The voltage Vds2 across the second diode 8 decreases, the second diode 8 turns to on at the time t3 and at the same time the second switching device 7 turns to on according to an on signal Vg2 from the control circuit 14. The performance does not change even if the current Iq2 flows through any one of the second diode 8 or the second switching device 7.

When the first switching means turns to off and the second switching means turns to on, a difference voltage (Vc1−Vin) between-the voltage Vc1 across the first capacitor 6 and the d-c source voltage Vin is applied across the primary winding 3a of the first transformer 3. At the same time, the voltage Vc2 across the second capacitor 56 is applied across the primary winding 53a of the second transformer 53. And the first rectifying diode 10 connected to the secondary winding 3b of the first transformer 3 turns to on and a current is supplied to the first output terminal 13-13'. The second rectifying diode 60 connected to the secondary winding 53b of the second transformer 53 turns to on and a current is supplied to the second output terminal 63-63', too.

The first capacitor 6 and the first leakage inductance or the first external inductor 12 of the first transformer 3 make a resonance. The current Is1 flowing in the first rectifying diode 10 flows increasingly from zero at t3 and returns to zero again at t4, varying sinusoidally. Similarly, the second capacitor 56 and the second leakage inductance or the second external inductor 62 of the second transformer 53 make a resonance at the same time t3. The current Is2 flowing in the second rectifying diode 60 flows increasingly from zero at t3 and returns to zero again at t4, varying sinusoidally. As both the first rectifying diode 10 and the second rectifying diode 60 turn to off at zero current, turn-off recovery is not generated. When the first rectifying diode 10 and the second rectifying diode 60 turn to off, exciting currents Ip1 and Ip2 flow in the primary winding 3a of the first transformer 3 and in the primary winding 53a of the second transformer 53, respectively. Both currents decrease during the on-period of the second switching device 7, then become negative, and both the first transformer 3 and the second transformer 53 are excited inversely.

When the second switching device 7 turns to off at the time t5 according to an off-signal from the control circuit 14, the third capacitor 9 discharges with an inverse exciting current and the voltage Vds1 across the first switching device 4 gradually decreases. The voltage Vds1 decreases and the first diode 5 turns to on and at the same time the first switching device 4 turns to on according to a signal from the control circuit 14. The performance does not change even if the current Iq1 flows through any one of the second switching device 4 or the second diode 5.

When the first switching device 4 turns to on and the second switching device 7 turns to off, the d-c source voltage Vin is applied across the primary winding 3a of the first transformer 3, and the voltage (Vin+Vc1−Vc2) is applied across the primary winding 53a of the second transformer 53. This action is repeated. Although the turn-on timing among the second diode 8, the first rectifying diode 10 and the second rectifying diode 60 and the turn-off timing between the first rectifying diode 10 and the second rectifying diode 60 may not perfectly coincide depending on output current, a basic performance does not change.

Assuming an on-period of the first switching means Ton, and an on-period of the second switching means Toff, and neglecting the periods when both the first and the second switching devices 4 and 7 are simultaneously off, the following equations are derived from a reset condition of the first transformer 3.

$$Vin \times Ton = Vc1 \times Toff,$$

and from a reset condition of the second transformer 53, $$(Vin + Vc1 - Vc2) \times Ton = Vc2 \times Toff.$$

From the above two equations, Vc1 and Vc2 are derived as follows:

$$Vc1 = (Ton/Toff) \times Vin,$$

and $$Vc2 = (Ton/Toff) \times Vin.$$

If the turn-ratio of the primary winding 3a to the secondary winding 3b of the first transformer 3 is (n1: 1) and the turn-ratio of the primary winding 53a to the secondary winding 53b of the second transformer 53 is (n2: 1), the output voltage Vout1 across the first output terminals 13 and 13' is $$Vout1 = Vin/n1 = (Ton/Toff) \times (Vin/n1),$$

and the output voltage Vout2 across the second output terminals 53 and 53' is $$Vout2 = Vc2/n2 = (Ton/Toff) \times (Vin/n2).$$

Thus both the first d-c output voltage Vout1 and the second d-c output voltage Vout2 can be controlled by varying the on/off ratio of the first switching device and the second switching device 7.

(Third exemplary embodiment)

Figure 7:
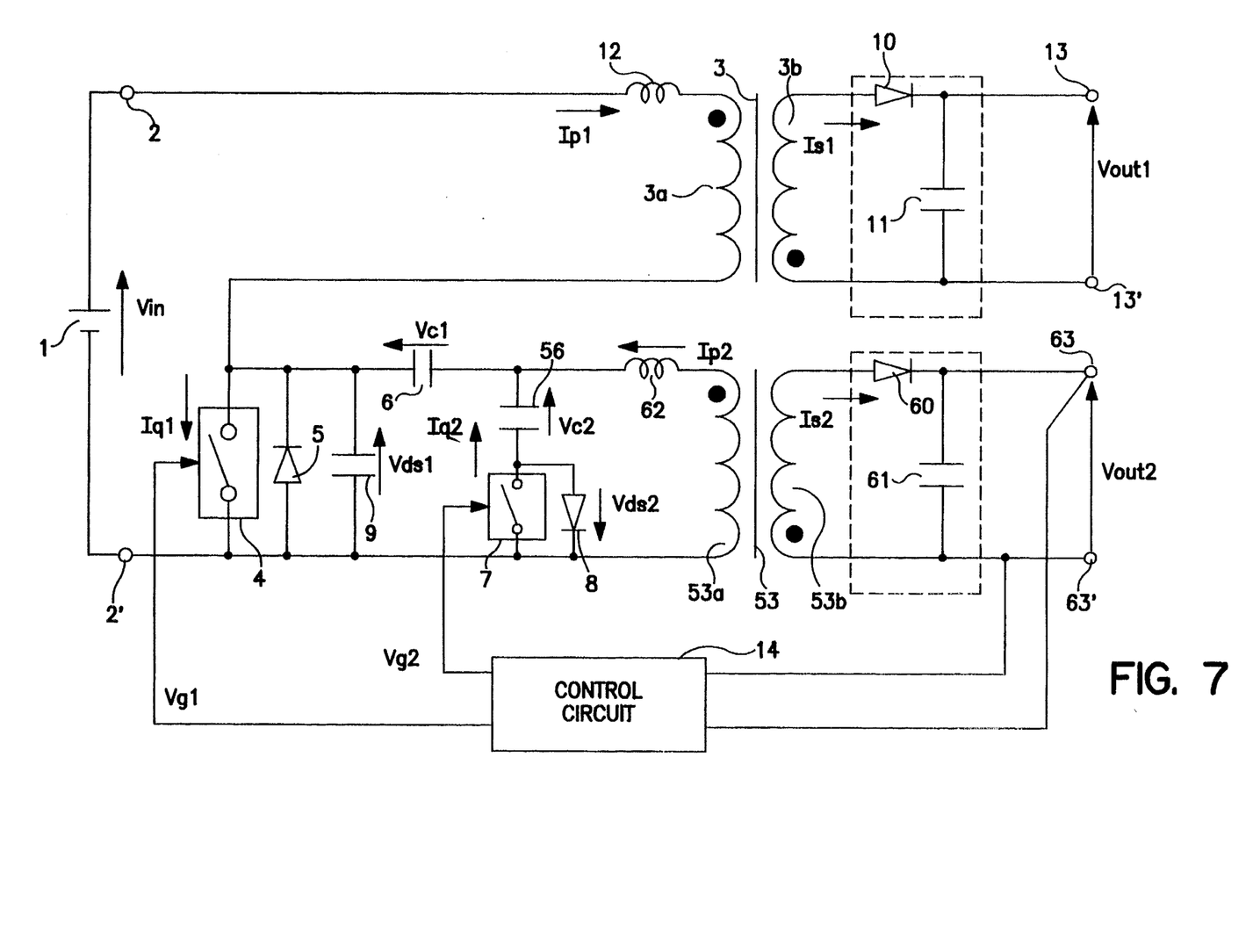
FIG. 7 is a circuit diagram of a switching power supply in accordance with a still further exemplary embodiment of the present invention.

A third exemplary embodiment of the present invention is illustrated by FIG. 7 and FIG. 8. FIG. 7 shows a circuit diagram of the switching power supply. Although the circuit configuration of the third exemplary embodiment is different from that of the first exemplary embodiment, waveforms at each point in FIG. 7 are quite the same as those in the first exemplary embodiment, so the function is explained referring to FIG. 8(a)–(j).

A d-c source 1 has a positive terminal 2 and a negative terminal 2'. A first transformer 3 has a primary winding 3a and at least one secondary winding 3b. The secondary winding 3b is wound with an opposite polarity to the primary winding 3a as shown with black dots in the figure. A second transformer 53 has a primary winding 53a and at least one secondary winding 53b. The secondary winding 53b is wound with the same polarity as the primary winding 53a as shown with black dots.

A first switching means is composed of a parallel connection of a first switching device 4 and a first diode 5. A second switching means is composed of a parallel connection of a second switching device 7 and a second diode 8.

A first capacitor 6 holds d-c voltage Vc1 and a second capacitor 56 holds d-c voltage Vc2. A third capacitor 9 is connected in parallel with the first switching device 4 and it suppresses a steep surge voltage across the first switching device 4 and the second switching device 7. The capacitance value of the third capacitor 9 is much smaller than those of the first and the second capacitors 6 and 56.

A first rectifying/filtering means is composed of a first rectifying diode 10 and a filtering capacitor 11 and is connected across the secondary winding 3b of the first transformer 3. A first regulated d-c output voltage is taken out from a first output terminal 13–13' through the first rectifying/filtering means. A second rectifying/filtering means is composed of a second rectifying diode 60 and a second filtering capacitor 61 and is connected across the secondary winding 53b of the second transformer 53. A second regulated d-c output is taken out from a second output terminal 63–63' through the second rectifying/filtering means.

A first leakage inductance or a first external inductor 12 is connected in series with the primary winding 3a of the first transformer 3 and resonates with the first capacitor 6 during an on-period of the second switching device 7 and makes a current flowing in the secondary winding 3b of the first transformer 3 sinusoidal. A second leakage inductance or a second external inductor 62 is connected in series with the primary winding 53a of the second-transformer 53 and resonates with the second capacitor 56 during an on-period of the second switching device 7 and makes a current flowing in the secondary winding 53b of the second transformer 53 sinusoidal. The external inductors are added when they are insufficient to obtain a desired resonance period if with only a leakage inductance of the transformer.

A control circuit 14 detects a voltage Vout2 across the second output terminal 63–63' and varies on/off ratios of signals to the first switching device 4 and to the second switching device 7 according to the value of the detected output voltage Vout2 so that the first and the second output voltages Vout1 and Vout2 become constant. The first switching device 4 repeats an on/off action and the second switching device 7 repeats an off/on action. That is, while the first switching device 4 is on, the second switching device 7 is off, and vice versa except that both switching devices 4 and 7 are off during two short transition periods. The two periods are from the time t2 (the first switching device 4 turns to off) to the time t3 (the second switching device 7 turns to on) and from the time t5 (the second switching device 7 turns to off) to the time t6 (the first switching device 4 turns to on).

When the first switching device 4 turns to on and the second switching device 7 turns to Off according to signals from the control circuit 14 at the time t1, the d-c source voltage Vin is applied across the primary winding 3a of the first transformer 3. Across the primary winding 53a of the second transformer 53, the voltage Vc1 across the first capacitor 6 is applied. At this time, both the first rectifying diode 10 connected to the secondary winding 3b of the first transformer 3 and the second rectifying diode 60 connected to the secondary winding 53b of the second transformer 53 are in an off-state. Both the primary current Ip1 of the first transformer 3 and the primary current Ip2 of the second transformer 53 linearly increase and exciting energy is stored both in the first transformer 3 and in the second transformer 53.

When the first switching device 4 turns to off at the time t2 according to an off-signal from the control circuit 14, the current Iq1 flowing in the first switching device 4 charges the third capacitor 9 up, the voltage Vds1 across the first switching device 4 gradually increases, and the voltage Vds2 across the second switching device 7 gradually decreases.

The voltage Vds2 across the second diode 8 decreases, the second diode 8 turns to on at the time t3 and at the same time the second switching device 7 turns to on according to an on signal Vg2 from the control circuit 14. The performance does not change even if the current Iq2 flows through any one-of the second diode 8 or the second switching device 7.

When the first switching means turns to off and the second switching means turns to on, the voltage (Vc1+Vc2−Vin) is applied across the primary winding 3e of the first transformer 3. At the same time, the voltage Vc2 across the second capacitor 56 is applied across the primary winding 53a of the second transformer 53. The first rectifying diode 10 connected to the secondary winding 3b of the first transformer 3 turns to on and a current is supplied to the first output terminal 13–13′. The second rectifying diode 60 connected to the secondary winding 53b of the second transformer 53 turns to on and a current is supplied to the second output terminal 63–63′.

The first capacitor 6 and the first leakage inductance or the first external inductor 12 of the first transformer 3 make a resonance, the current Is1 flowing in the first rectifying diode 10 flows increasingly from zero at t3 and returns to zero again at t4, varying sinusoidally. Similarly, the second capacitor 56 and the second leakage inductance or the second external inductor 62 of the second transformer 53 make a resonance at the same time t3, the current Is2 flowing in the second rectifying diode 60 flows increasingly from zero at t3 and returns to zero again at t4, varying sinusoidally. As both the first rectifying diode 10 and the second rectifying diode 60 turn to off at zero current, turn-off recovery is not generated. When the first rectifying diode 10 and the second rectifying diode 60 turn to off, exciting currents Ip1 and Ip2 flow in the primary winding 3a of the first transformer 3 and in the primary winding 53a of the second transformer 53, respectively. Both currents decrease during the on-period of the second switching device 7, then become negative, and both the first transformer 3 and the second transformer 53 are excited inversely.

When the second switching device 7 turns to off at the time t5 according to an off-signal from the control circuit 14, the third capacitor 9 discharges with an inverse exciting current and the voltage Vds1 across the first switching device 4 gradually decreases. The voltage Vds1 decreases and the first diode 5 turns to on. At the same time the first switching device 4 turns to on according to a signal from the control circuit 14. The performance does not change even if the current Iq1 flows through any one of the second switching device 4 or the second diode 5.

When the first switching device 4 turns to on and the second switching device 7 turns to off, the d-c source voltage Vin is applied across the primary winding 3a of the first transformer 3, and the voltage Vc1 across the first capacitor 6 is applied across the primary winding 53a of the second transformer 53. This action is repeated. Although the turn-on timing among the second diode 8, the first rectifying diode 10 and the second rectifying diode 60 and the turn-off timing between the first rectifying diode 10 and the second rectifying diode 60 may not perfectly coincide depending on output current, basic performance does not change.

Assuming an on-period of the first switching means Ton, and an on-period of the second switching means Toff, and neglecting the periods when both the first and the second switching devices 4 and 7 are simultaneously off, the following equations are derived from a reset condition of the first transformer 3.

$$Vin \times Ton = (Vc1 + Vc2 - Vin) \times Toff,$$

and from a reset condition of the second transformer 53, $$Vc1 \times Ton = Vc2 \times Toff.$$

From the above two equations, Vc1 and Vc2 are derived as follows.

$$Vc1 = Vin,$$

and $$Vc2 = (Ton/Toff) \times Vin.$$

If the turn-ratio of the primary winding 3a to the secondary winding 3b of the first transformer 3 is (n1: 1) and the turn-ratio of the primary winding 53a to the secondary winding 53b of the second transformer 53 is (n2: 1), the output voltage Vout1 across the first output terminals 13 and 13′ is $$Vout1 = (Vc1 + Vc2 - Vin)/n1 = (Ton/Toff) \times (Vin/n1),$$

and the output voltage Vout2 across the second output terminals 53 and 53′ is $$Vout2 = Vc2/n2 = (Ton/Toff) \times (Vin/n2).$$

Thus both the first d-c output voltage Vout1 and the second d-c output voltage Vout2 can be controlled by varying the on/off ratio of the first switching device 4 and the second switching device 7.

Although the input voltage to the control circuit 14 was explained to be taken out from the second output terminal 63–63′, it may taken out from the first output terminal 13–13′.

According to the above three exemplary embodiments, as when the first switching device 4 and the second switching device 7 turn to off the first diode 5 and the second diode 8 turn to on simultaneously, no spike voltages due to the leakage-inductances of the transformers are generated, being absorbed by the first capacitor 6 and the second capacitor 56 effectively.

As the first rectifying diode 10 and the second rectifying diode 60 are switched at zero current, it is possible to make noise small.

As the turn-off current of the second switching device 7 can be small, its switching loss can be made small.

As the two outputs Vout1 and Vout2 are taken out from the separate transformers 3 and 53, exciting currents of the transformers are small, their inductance values can be comparatively large and the number of turns of their windings can be freely designed. Generally, as the number of turns of a winding are few in a high frequency design, it is difficult to design a secondary voltage finely. But according to this invention, as the number of turns of a winding can be freely designated, it is a merit in a high frequency design.

The voltages Vc1 and Vc2 which are held across the first and the second capacitors 6 and 56, respectively, are sums of d-c components and variable components which are resonant voltages. These variable components are small compared with the d-c components, and the amplitudes of the resonance can be varied by choosing appropriate capacitance values for the first and the second capacitors 6 and 56. So the regulation characteristics of the first and the second output voltages Vout1 and Vout2 can be freely varied.

As the input current is continuous, low noise design is possible.

By adding a third capacitor 9, the voltages Vds1 and Vds2 across the first and the second switching means, respectively, vary gradually and their switching losses at turn-on and turn-off become small. As the third capacitor 9 is short-circuited by the first switching device 4 when voltage across the third capacitor 9 decreases to zero, no power loss is generated even if the third capacitor 9 is added.

As the resonant frequencies of the resonance currents flowing through the secondary winding 3b and 53b of the first and the second transformers 3 and 53 are determined by the first and the second capacitors 6 and 56 and the first and the second leakage inductances or the external inductors 12 and 62 in the first and the second transformers 3 and 53, respectively.

Therefore, an excellent switching power supply with a small size, high efficiency and low noise can be realized.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A switching power supply comprising:
    a series connection of a primary winding of a first transformer having at least one secondary winding and a first switching means connected across a d-c power source,
    a series connection of a second switching means and a first capacitor connected in parallel with said first switching means,
    a series connection of a primary winding of a second transformer having at least one secondary winding and a second capacitor connected in parallel with said second switching means,
    wherein a first and a second rectifying/filtering means are connected in parallel with each secondary winding of the first and the second transformer, respectively, and d-c outputs are taken out from said secondary windings of said first and said second transformers through said first and second rectifying/filtering means.

2. A switching power supply as recited in claim 1, wherein
    a third capacitor is connected across at least one of said first switching means and said second switching means, and both said first switching means and said second switching means have two short off-periods simultaneously at a forepart and a rearpart of an off-period of said first switching means.

3. A switching power supply comprising:
    a series connection of a primary winding of a first transformer having at least one secondary winding and a first switching means connected across a d-c power source,
    a series connection of a second switching means, and a first capacitor connected in parallel with said primary winding of said first transformer,
    a series connection of a primary winding of a second transformer having at least one secondary winding and a second capacitor connected in parallel with said second switching means,
    wherein a first and a second rectifying/filtering means are connected in parallel with each secondary winding of the first and the second transformers, respectively, and d-c outputs are taken out from said secondary windings of said first and said second transformers through each rectifying/filtering means.

4. A switching power supply as recited in claim 3, wherein
    a third capacitor is connected across at least one of said first switching means, and said second switching means,
    wherein a first and a second rectifying/filtering means and connected in parallel with each secondary winding of the first and the second transformers, respectively, and both said first switching means and said second switching means have two short off periods simultaneously at a forepart and a rear part of a off period of said first switching means.

5. A switching power supply comprising:
    a series connection of a primary winding of a first transformer having at least one secondary winding and a first switching means connected across a d-c power source,
    a series connection of a primary winding of a second transformer having at least one secondary winding and a first capacitor which is connected in parallel with said first switching means,
    a series connection of a second switching means, and a second capacitor connected in parallel with said primary winding of said second transformer,
    wherein a first and a second rectifying/filtering means are connected in parallel with each secondary winding of the first and the second transformers, respectively, and d-c outputs are taken out from said secondary windings of said first and said second transformers through each of said first and second rectifying/filtering means.

6. A switching power supply as recited in claim 5, wherein
   a third capacitor is connected across at least one of said first switching means, and said second switching means, and
   wherein a first and a second rectifying/filtering means are connected in parallel with each secondary winding of the first and the second transformers, respectively, and both said first switching means and said second switching means have two short off periods simultaneously at a forepart and a rear part of an off period of said first switching means.

* * * * *